(12) United States Patent
Andou et al.

(10) Patent No.: US 8,991,864 B2
(45) Date of Patent: Mar. 31, 2015

(54) STEERING DEVICE

(75) Inventors: Kouji Andou, Maebashi (JP); Yukihiro Matsumoto, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/379,162

(22) PCT Filed: Oct. 5, 2011

(86) PCT No.: PCT/JP2011/072928
§ 371 (c)(1),
(2), (4) Date: Oct. 4, 2013

(87) PCT Pub. No.: WO2012/098738
PCT Pub. Date: Jul. 26, 2012

(65) Prior Publication Data
US 2014/0026706 A1 Jan. 30, 2014

(30) Foreign Application Priority Data

Jan. 21, 2011 (JP) .................................. 2011-010822
Aug. 31, 2011 (JP) .................................. 2011-190127

(51) Int. Cl.
*B62D 1/19* (2006.01)
*F16F 7/12* (2006.01)

(52) U.S. Cl.
CPC ............... *B62D 1/192* (2013.01); *F16F 7/125* (2013.01)
USPC ......................................................... 280/777

(58) Field of Classification Search
USPC ......................................................... 280/777
See application file for complete search history.

(56) References Cited

U.S. PATENT DOCUMENTS

| | | | | |
|---|---|---|---|---|
| 5,813,794 A | * | 9/1998 | Castellon | 403/359.5 |
| 5,954,362 A | * | 9/1999 | Aota et al. | 280/777 |
| 6,530,599 B1 | * | 3/2003 | Oka | 280/777 |
| 6,574,850 B1 | * | 6/2003 | Sadakata | 29/525 |
| 6,619,694 B2 | * | 9/2003 | Sadakata | 280/777 |
| 6,935,657 B2 | * | 8/2005 | Kondou et al. | 280/777 |

FOREIGN PATENT DOCUMENTS

| | | | | |
|---|---|---|---|---|
| JP | 09267753 | A | * | 10/1997 |
| JP | 2003237592 | A | * | 8/2003 |
| JP | 2008-87531 | A | * | 4/2008 |

* cited by examiner

*Primary Examiner* — Drew Brown
(74) *Attorney, Agent, or Firm* — Crowell & Moring LLP

(57) ABSTRACT

A steering device easily sets an absorption amount of impact energy to a predetermined magnitude at a time when a female male shaft and a male shaft undergo relative contraction upon occurrence of a vehicle collision. If the male shaft undergoes contraction by a length against the female shaft, a serrated edge on a right-end surface of the female shaft is butted against a left-end surface of an impact-energy absorption part. Then, the serrated edge of a female serration is firmly butted against a left-end surface of the impact-energy absorption part to undergo plastic deformation, whereupon resistance to collapsing increases, thereby absorbing impact energy.

7 Claims, 8 Drawing Sheets

STEERING DEVICE

TECHNICAL FIELD

The invention relates to a steering device, and in particular, to a steering device capable of transferring a rotation torque, and mitigating an impact applied to a driver by undergoing relative contraction in the axial direction thereof at the time of a collision, such as, for example, a steering device having an intermediate shaft, a steering shaft, and so forth.

BACKGROUND ART

For a steering device, use ids made of such a steering device as shown in FIG. 7 in order to transfer rotation of a steering wheel to a steering gear. As shown in FIG. 7, the steering device is provided with a steering shaft 12 in which a steering wheel can be mounted, the steering shaft 12 being on the rear side of a vehicle body (on the right-hand side in the FIG. 7), a steering column 13 with the steering shaft 12 inserted therethrough, and a steering gear coupled to the steering column 13 via a rack and pinion mechanism (not shown), the steering gear being on the front side of the vehicle body (on the left-hand side in the FIG. 7).

With the steering shaft 12, a female steering shaft (female shaft) 12A is serration (or spline)-fitted onto a male steering shaft (male shaft) 12B in such a way as to cause a rotation torque to be transferable, and these members to be relatively movable in the axial direction of the steering shaft 12. Accordingly, the female steering shaft 12A and the male steering shaft 12B causes a spline-fitted joint to make a relative movement at the time of a collision, thereby enabling the whole length of the steering shaft 12 to be contracted.

Further, the steering column 13 cylindrical in shape, with the steering shaft 12 inserted therethrough, has a so-called collapsible structure. More specifically, an outer column 13A and an inner column 13B are combined with each other in such a way as to be telescopically movable, and if an impact in the axial direction is applied thereto at the time of a collision, the steering column 13 undergoes contraction in total length while absorbing energy of the impact.

The outer column 13A is supported by a part of a body 18, such as the underside of a dashboard, and so forth, through the intermediary of an upper support bracket 14. Further, a stopper (not shown) is provided between the upper support bracket 14, and the body 18 such that the upper support bracket 14 is dislodged from the stopper to be movable toward the front side of the body when an impact in a direction toward the front side of the body is applied to the upper support bracket 14. Further, an end of the inner column 13B, on a side thereof, adjacent to the front of the body, is also supported by a part of the body 18 through the intermediary of a lower support bracket 19.

An end of the female steering shaft 12A, on a side thereof, adjacent to the front of the body, is coupled to the rear end of an intermediate shaft 16 via a universal coupling 15. Further, an input axis of a steering gear (not shown) is coupled to the front end of the intermediate shaft 16 via another universal coupling 17. With the intermediate shaft 16, an end of a male intermediate shaft (male shaft) 16B, on the rear side of the body, is serration (or spline)-fitted into an end of a female intermediate shaft (female shaft) 16A, on the front side of the body, thereby permitting these members to be fitted with each other in such a way as to enable a rotation torque to be transferable, and to be relatively movable in the axial direction.

The rotation of a steering wheel 11 is transferred to the steering gear via the male steering shaft 12B, the female steering shaft 12A, the universal coupling 15, the female intermediate shaft 16A, the male intermediate shaft 16B, and the universal coupling 17, thereby causing wheels (not shown) of a vehicle to be steered.

The steering device described as above need to have a structure constructed such that at a time when the male shaft is serration (or spline)-fitted into the female male shaft upon occurrence of a vehicle collision to undergo relative contraction, resistance to collapsing in the middle of the contraction is increased to thereby increase an absorption amount of impact energy, enabling the impact energy to be sufficiently absorbed even at a short collapse-stroke. In Patent Document 1, there is disclosed such an impact-absorption type steering shaft as shown in FIG. 8.

FIG. 8 (a) is a sectional view showing principal parts of the male shaft 12B, and the female shaft 12A, shown in FIG. 7, respectively, and FIG. 8 (b) is an enlarged perspective view of a part R shown in 8 (a). As shown in FIG. 8 (a), a male serration 20 formed on the outer periphery of the left-end of the male shaft 12B is fitted into a female serration 30 formed on the inner periphery of the right-end of the female shaft 12A to be brought into serration-engagement with the latter.

A protrusion 23 is formed in a recess 22 between tooth 21 of the male serration 20, positioned at a part of the male serration 20, in the axial direction thereof, located at a spot in the circumferential direction thereof. The position of the protrusion 23, in the axial direction of the male serration 20, is a position where the protrusion 23 will not come into engagement with the female serration 30 at the time of a normal driving operation, allowing the protrusion 23 to come into engagement with the female serration 30 when the male shaft and the female male shaft undergo relative contraction at the time of a vehicle collision.

If the female male shaft 12A, and the male shaft 12B undergo relative contraction at the time of a vehicle collision, the protrusion 23 of the male serration 20 is brought into engagement with a serrated edge of the female serration 30 to thereby cause the serrated edge of the female serration 30 to undergo plastic deformation. As a result, the resistance to collapsing will increase, thereby causing an absorption amount of impact energy to be increased.

With the impact-absorption type steering shaft described in Japanese Utility Model Registration No. 2607069, an absorption amount of impact energy can be increased by increasing the resistance to collapsing in the middle of contraction. However, since the protrusion 23 is provided only at a specified spot in the circumferential direction of the male serration 20, it has been difficult to set the absorption amount of impact energy to a predetermined magnitude because the absorption amount of impact energy varies depending on in which phase in the circumferential direction of the male serration 20 the protrusion 23 will be present.

Further, as shown in Japanese Unexamined Patent Application Publication No. Hei8 (1996)-91230, there is available an impact-absorption type steering shaft having a configuration such that a female steering shaft 12A, and a male steering shaft 12B undergo plastic deformation into the shape of an ellipse in cross-section by pressing down the outer peripheral surface of the female steering shaft 12A inward in the radial direction thereof to thereby absorb impact energy. However, if a structure of Japanese Unexamined Patent Application Publication No. Hei8 (1996)-91230 is applied to the structure of Japanese Utility Model Registration No. 2607069, this will render it difficult to align the position of the protrusion 23, in the circumferential direction of the male serration 20, with the phase of the ellipse formed due to the plastic deformation, so that it has been difficult to set the absorption amount of impact energy to a predetermined magnitude.

Japanese Utility Model Registration No. 2607069
Japanese Unexamined Patent Application Publication No. Hei8 (1996)-91230

SUMMARY OF INVENTION

Technical Problem

It is therefore an object of the invention to provide a steering device capable of easily setting an absorption amount of impact energy to a predetermined magnitude at a time when a female male shaft and a male shaft undergo relative contraction at the time of a vehicle collision.

Solution to Problem

The problem described as above can be solved by use of the following means. More specifically, in accordance with a first aspect of the invention, there is provided a steering device comprising a male shaft capable of transferring rotation of a steering wheel, a male serration formed on the outer periphery of the male shaft, a female shaft fitted onto the male shaft, and a female serration formed on the inner periphery of the female shaft to be brought into engagement with the male serration in such a way as to be relatively movable in the axial direction of the male serration, and to cause a rotation torque to be transferable, wherein an impact-energy absorption part formed in such a way as to surround the whole circumference of the outer periphery of the male shaft, having a predetermined length in the axial direction of the male serration, an outside diameter of the impact-energy absorption part being larger in size than a diameter of a circle of a serrated edge of the female serration, so as to cause the serrated edge of the female serration to be butted against the impact-energy absorption part, thereby absorbing impact energy, is provided in a region where, upon the male shaft undergoing relative contraction against the female male shaft at the time of a vehicle collision, the male serration comes into engagement with the female serration in the middle of the contraction.

The invention provides in its second aspect the steering device wherein the impact-energy absorption part is formed at a plurality of spots apart from each other in the axial direction of the male shaft.

The invention provides in its third aspect the steering device wherein a length of the impact-energy absorption part, in the axial direction thereof, is set such that an absorption amount of the impact energy will be at a predetermined magnitude.

The invention provides in its fourth aspect the steering device wherein an outside diameter size of the impact-energy absorption part is set such that an absorption amount of the impact energy will be at a predetermined magnitude.

The invention provides in its fifth aspect the steering device wherein hardness of the male shaft is set such that an absorption amount of the impact energy will be at a predetermined magnitude.

The invention provides in its sixth aspect the steering device wherein a tilt angle of a butting surface where the impact-energy absorption part is butted against the serrated edge of the female serration is set such that an absorption amount of the impact energy will be at a predetermined magnitude.

The invention provides in its seventh aspect the steering device wherein a tilt angle of a butting surface where the serrated edge of the female serration is butted against the impact-energy absorption part is set such that an absorption amount of the impact energy will be at a predetermined magnitude.

The invention provides in its eighth aspect the steering device wherein an outer peripheral surface of the female shaft is pressed inward in the radial direction thereof to thereby cause the female shaft, and the male shaft to undergo plastic deformation into the shape of an ellipse in cross-section such that an absorption amount of the impact energy will be at a predetermined magnitude.

Advantageous Effect of Invention

With the steering device according to the present invention, the impact-energy absorption part formed in such a way as to surround the whole circumference of the outer periphery of the male shaft, having a predetermined length in the axial direction of the male serration, an outside diameter of the impact-energy absorption part being larger in size than the diameter of the circle of the serrated edge of the female serration, so as to cause the serrated edge of the female serration to be butted against the impact-energy absorption part, thereby absorbing the impact energy, is provided in the region where, upon the male shaft undergoing relative contraction against the female male shaft at the time of a vehicle collision, the male serration comes into engagement with the female serration in the middle of the contraction.

Accordingly, upon the female shaft and the male shaft undergoing relative contraction at the time of a vehicle collision, the serrated edge of the female serration is butted against the impact-energy absorption part, throughout the outer periphery of the male shaft, in the circumferential direction thereof, so that the absorption amount of impact energy can be stabilized, rendering it easier to set the absorption amount of impact energy to a predetermined magnitude.

DESCRIPTION OF EMBODIMENTS

Referring to the accompanied drawings, first to second embodiments of the invention are each described hereinafter.

First Embodiment

Figure 1:
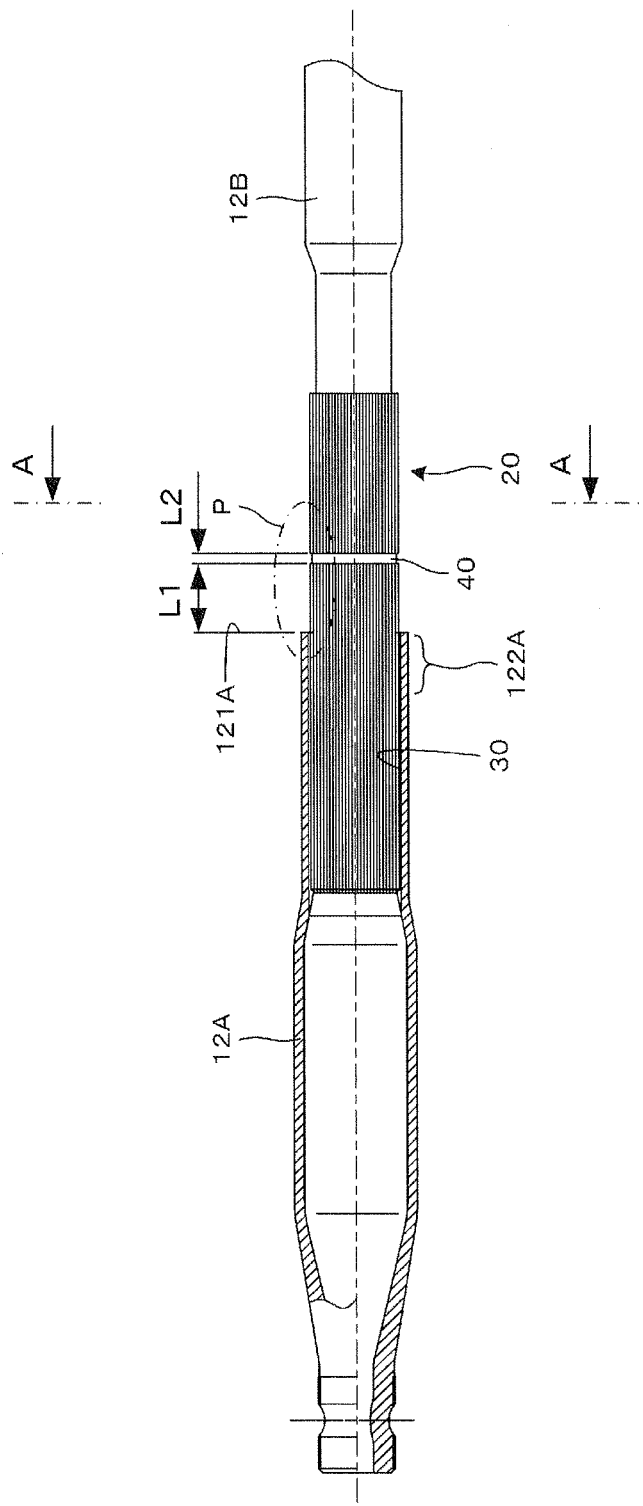
FIG. 1 is a sectional view showing principal parts of a male shaft, and a female shaft, respectively, as to a steering device according to the first embodiment of the invention.
Figure 2:
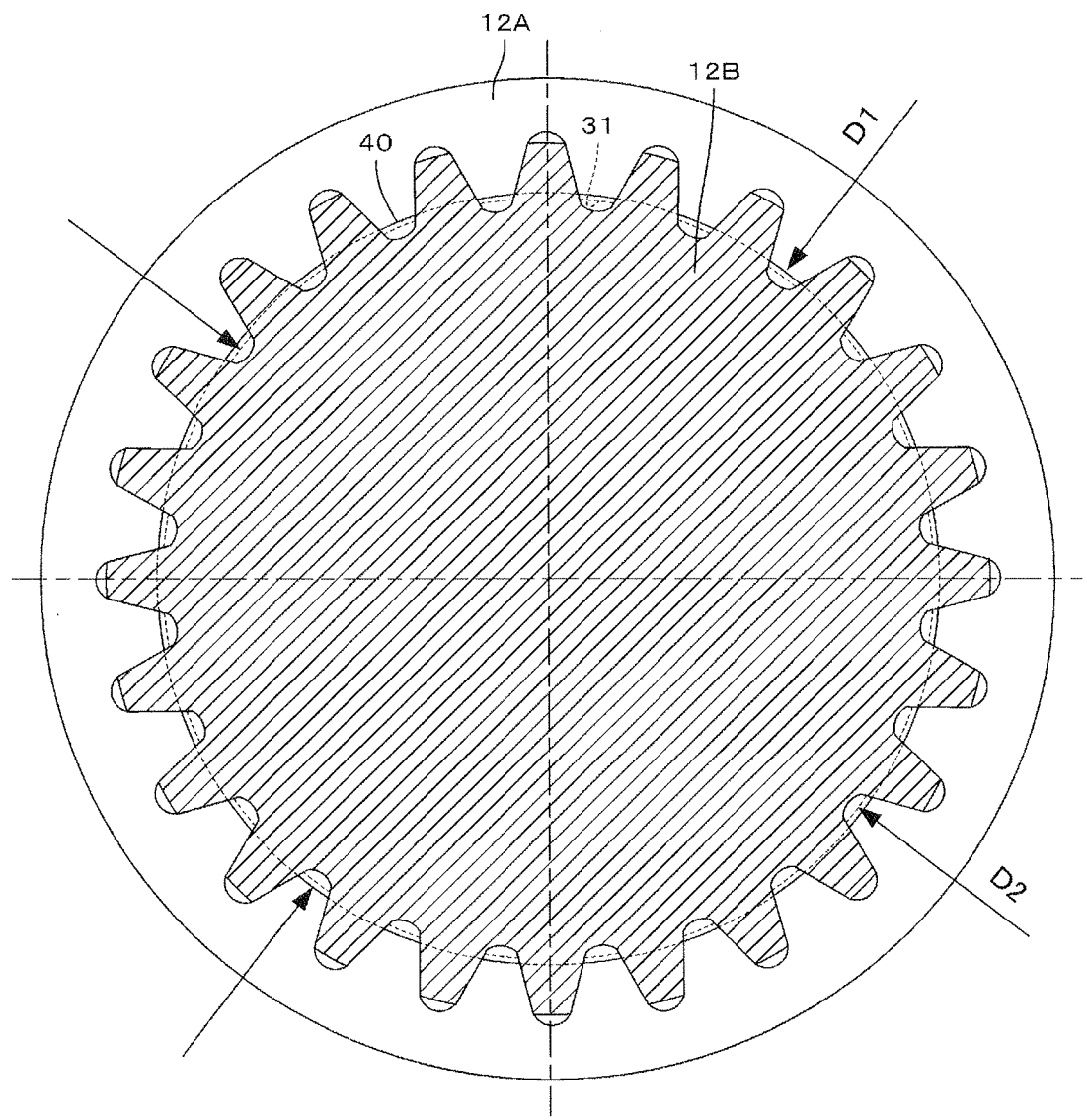
FIG. 2 is a cross-sectional view taken on line A-A of FIG. 1.

FIG. 1 is a sectional view showing principal parts of a male shaft, and a female shaft, respectively, as to a steering device according to the first embodiment of the invention. FIG. 2 is a cross-sectional view taken on line A-A of FIG. 1, and FIG. 3 (a) is an enlarged sectional view of a part P shown in FIG. 1. As shown in FIG. 1, a male serration 20 formed on the outer periphery of the left-end of a male shaft 12B is fitted into a female serration 30 formed on the inner periphery of the right-end of a female shaft 12A to be brought into serration-engagement with the latter. The male shaft 12B is formed in the shape of a hollow cylinder (not shown).

Figure 3:
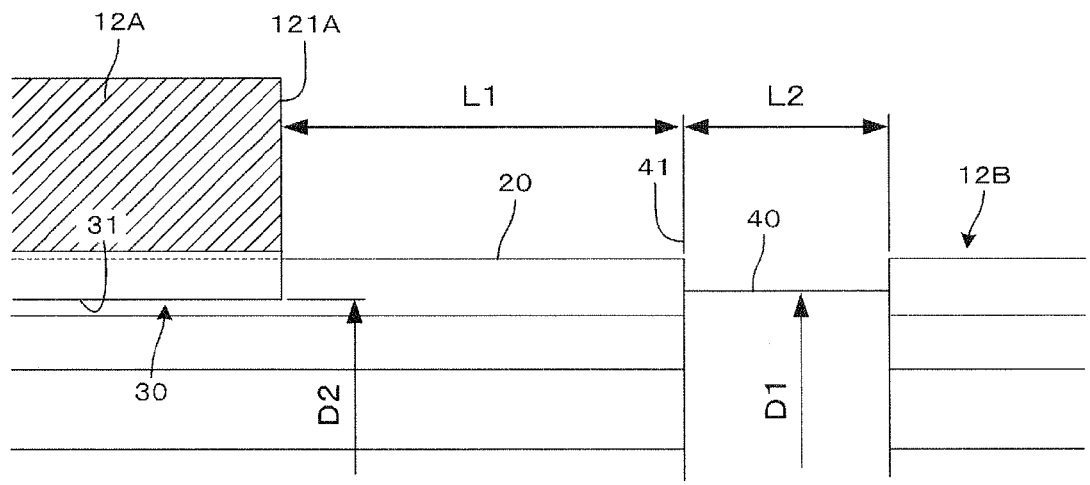
FIG. 3 (a) is an enlarged sectional view of a part P shown in FIG. 1, FIG. 3 (b) being an enlarged sectional view showing a variation of the steering device shown in FIG. 3 (a)
Figure 3:
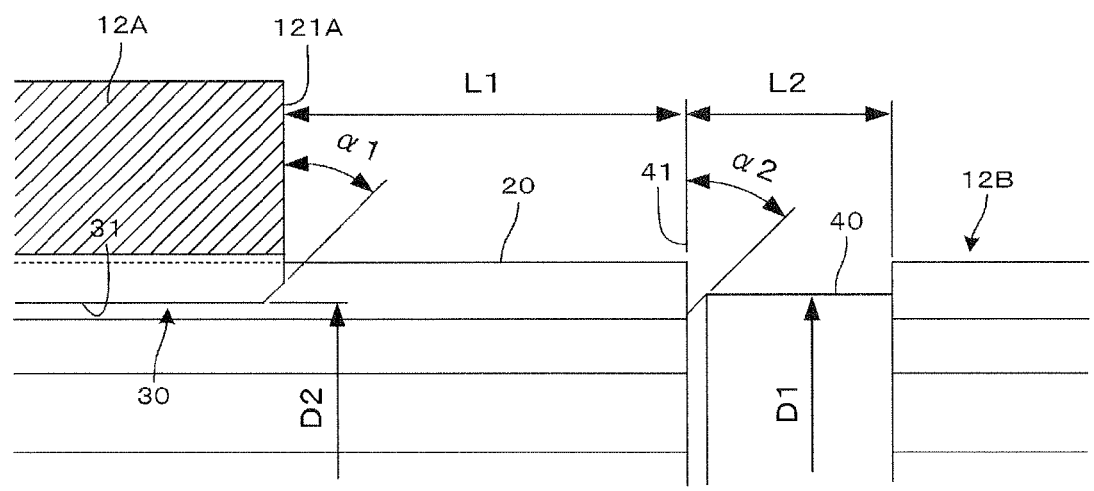

As shown in FIG. 1 to FIGS. 3 (a), 3 (b), the male serration 20 includes an impact-energy absorption part 40 formed at a position away from a right-end surface (a butting surface) 121A of the female shaft 12A by a length L1. The impact-energy absorption part 40 has a length L2 in the axial direction of the male serration 20, and is formed in the shape of a cylinder surrounding the whole circumference of the outer periphery of the male shaft 12B. The impact-energy absorption part 40 is formed such that the outside diameter size D1 thereof is larger in size than a diameter D2 of a serrated edge circle of a serrated edge 31 of the female serration 30.

After the male serration 20 is brought into serration-engagement with the female serration 30, an outer peripheral surface 122A of the right-end of the female shaft 12A shown in FIG. 1 is pressed inward from the outer peripheral side thereof to be slightly crushed, thereby causing the female shaft 12A, and the male shaft 12B to undergo plastic deformation into the shape of an ellipse. As a result, the male shaft 12B is united with the female shaft 12A so as to prevent relative movement in the axial direction thereof unless a strong force to an extent, in the axial direction thereof, is applied thereto.

If a vehicle collision occurs, causing an increase in collapse-load acting between the female shaft 12A, and the male shaft 12B, this will cause the male shaft 12B to start contracting against the female shaft 12A.

If the male shaft 12B undergoes contraction by the length L1 against the female shaft 12A, the serrated edge 31 on the right-end surface (the butting surface) 121A of the female shaft 12A is butted against a left-end surface 41 (a butting surface) of the impact-energy absorption part 40. Then, the serrated edge 31 of the female serration 30 is firmly butted against the left-end surface 41 (the butting surface) of the impact-energy absorption part 40 to undergo plastic deformation, whereupon resistance to collapsing increases, thereby absorbing impact energy.

With the first embodiment of the invention, the serrated edge 31 of the female serration 30 is butted against the left-end surface 41 of the impact-energy absorption part 40, surrounding the whole outer periphery of the male shaft 12B, in the circumferential direction thereof, so that torsion does not occur between the female shaft 12A, and the male shaft 12B, and an absorption amount of impact energy is stabilized.

Further, even if the outer peripheral surface 122A of the right-end of the female shaft 12A is crushed to undergo plastic deformation into the shape of the ellipse, it is possible to set the absorption amount of impact energy to a predetermined magnitude regardless of a phase of the ellipse formed due to the plastic deformation because the impact-energy absorption part 40 is formed in the shape of the cylinder surrounding the whole circumference of the outer periphery of the male shaft 12B.

If at least one factor selected from among the length L2 of the impact-energy absorption part 40, in the axial direction thereof, the outside diameter size D1 of the impact-energy absorption part 40, and hardness of the male shaft 12B is set to a predetermined magnitude, this will enable the absorption amount of impact energy to be set to a predetermined magnitude. Further, if at least one factor selected from among a tilt angle $\alpha 1$ of the serrated edge 31 of the right-end surface (the butting surface) 121A of the female shaft 12A, and a tilt angle $\alpha 2$ of the left-end surface 41 (the butting surface) of the impact-energy absorption part 40, as shown in FIG. 3 (b), is set to a predetermined magnitude, this will enable the absorption amount of impact energy to be set to a predetermined magnitude.

Second Embodiment

Figure 4:
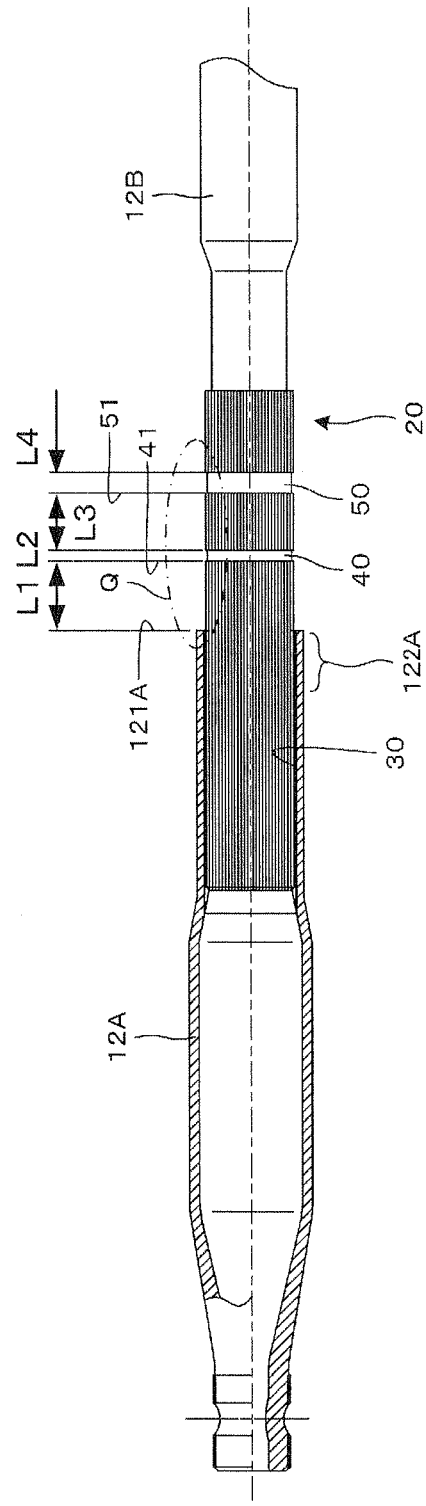
FIG. 4 is a sectional view showing principal parts of a male shaft, and a female shaft, respectively, as to a steering device according to a second embodiment of the invention.
Figure 5:
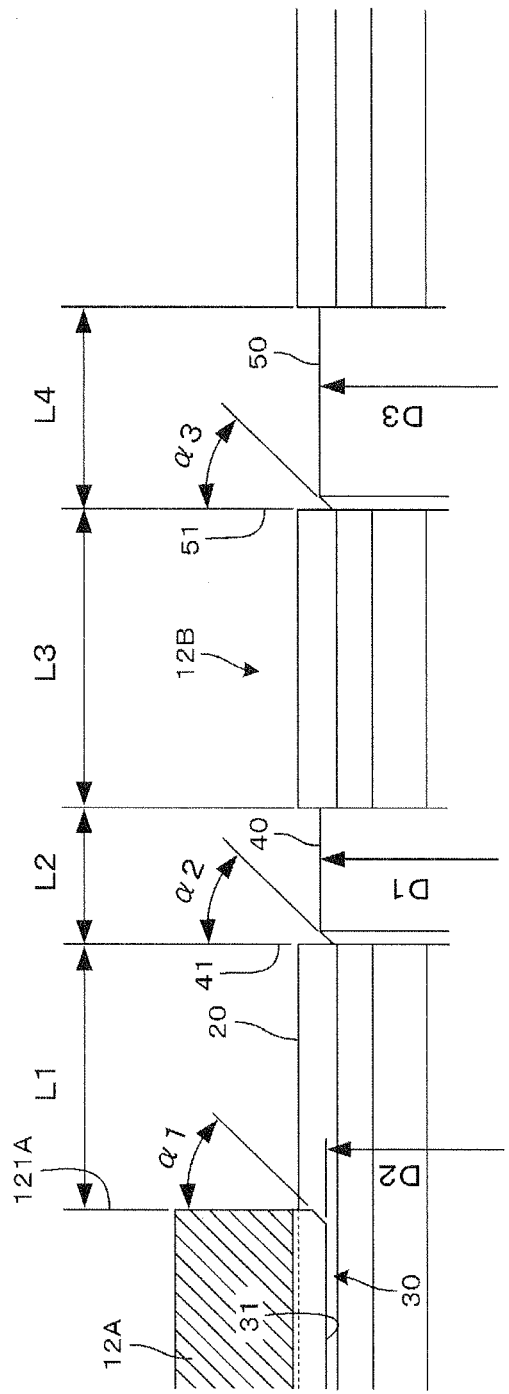
FIG. 5 is an enlarged sectional view of a part Q shown in FIG. 4.

Next, a steering device according to the second embodiment of the invention is described hereinafter. FIG. 4 is a sectional view showing principal parts of a male shaft, and a female shaft, respectively, as to the steering device according to the second embodiment of the invention, and FIG. 5 is an enlarged sectional view of a part Q shown in FIG. 4. In the following description, there are described only parts differing in structure from those according to the first embodiment, thereby omitting duplicated description. Further, in the figures, components identical to those according to the first embodiment are denoted by like reference numerals, respectively.

The second embodiment of the invention is a variation of the first embodiment, representing an example in which an impact-energy absorption part is formed at a plurality of spots apart from each other, in the axial direction of a male shaft 12B. As shown in FIGS. 4 to 5, a male serration 20 is provided with an impact-energy absorption part 40 that is formed at a position away from a right-end surface (a butting surface) 121A of a female shaft 12A by a length L1. Further, an impact-energy absorption part 50 is formed at a position away from the impact-energy absorption part 40 by a length L3.

The impact-energy absorption part 40 having a length L2, in the axial direction of the male serration 20, and the impact-energy absorption part 50 having a length L4, in the axial direction of the male serration 20, are each formed in the shape of a cylinder so as to surround the whole circumference of the outer periphery of the male shaft 12B. The impact-energy absorption part 40 having an outside diameter size D1, and the impact-energy absorption part 50 having an outside diameter size D3 are formed such that D1, D3 each are larger in size than a diameter D2 of a serrated edge circle of a serrated edge 31 of the female serration 30.

After the male serration 20 is brought into serration-engagement with the female serration 30, an outer peripheral surface 122A of the right-end of the female shaft 12A shown in FIG. 4 is pressed inward from the outer peripheral side thereof to be slightly crushed, thereby causing the female shaft 12A, and the male shaft 12B to undergo plastic deformation into the shape of an ellipse. As a result, the male shaft 12B is united with the female shaft 12A so as to prevent relative movement in the axial direction thereof unless a strong force to an extent, in the axial direction thereof, is applied thereto.

If a vehicle collision occurs, causing an increase in collapse-load acting between the female shaft 12A, and the male shaft 12B, this will cause the male shaft 12B to start contracting against the female shaft 12A.

If the male shaft 12B undergoes contraction by a length L1 against the female shaft 12A, a serrated edge 31 on a right-end surface (a butting surface) 121A of the female shaft 12A is butted against a left-end surface 41 (a butting surface) of the impact-energy absorption part 40. Then, the serrated edge 31 of the female serration 30 is firmly butted against the left-end surface 41 (the butting surface) of the impact-energy absorption part 40 to undergo plastic deformation, whereupon resistance to collapsing increases, thereby absorbing impact energy.

If the female shaft 12A passes through the impact-energy absorption part 40, and the male shaft 12B undergoes further contraction by a length L3 against the female shaft 12A, the serrated edge 31 on the right-end surface (the butting surface) 121A of the female shaft 12A is butted against a left-end surface 51 (a butting surface) of the impact-energy absorption part 50. Then, the serrated edge 31 of the female serration 30 is firmly butted against the left-end surface 51 (the butting surface) of the impact-energy absorption part 50 to undergo plastic deformation, whereupon resistance to collapsing increases, thereby absorbing impact energy.

With the second embodiment of the invention, the impact-energy absorption parts 40, 50 are formed at two spots apart from each other, respectively, in the axial direction of the male shaft 12B. Accordingly, it is possible to set an absorption characteristic of impact energy to a predetermined magnitude in accordance with the position of a collapse-move stroke, in the steering device.

If at least one factor selected from among the lengths L2, L4 of the impact-energy absorption parts 40, 50, respectively, in the axial direction thereof, the outside diameter sizes D1, D3 of the impact-energy absorption part s 40, 50, respectively, and hardness of the male shaft 12B is set to a predetermined magnitude, this will enable the absorption amount of impact energy to be set to a predetermined magnitude. Further, if at least one factor selected from among a tilt angle α1 of the serrated edge 31 on the right-end surface (the butting surface) 121A of the female shaft 12A, and respective tilt angles α2, α3 of the left-end surfaces 41, 51 (the butting surfaces) of the impact-energy absorption part s 40, 50, respectively, is set to a predetermined magnitude, this will enable the absorption amount of impact energy to be set to a predetermined magnitude.

Third Embodiment

Figure 6:
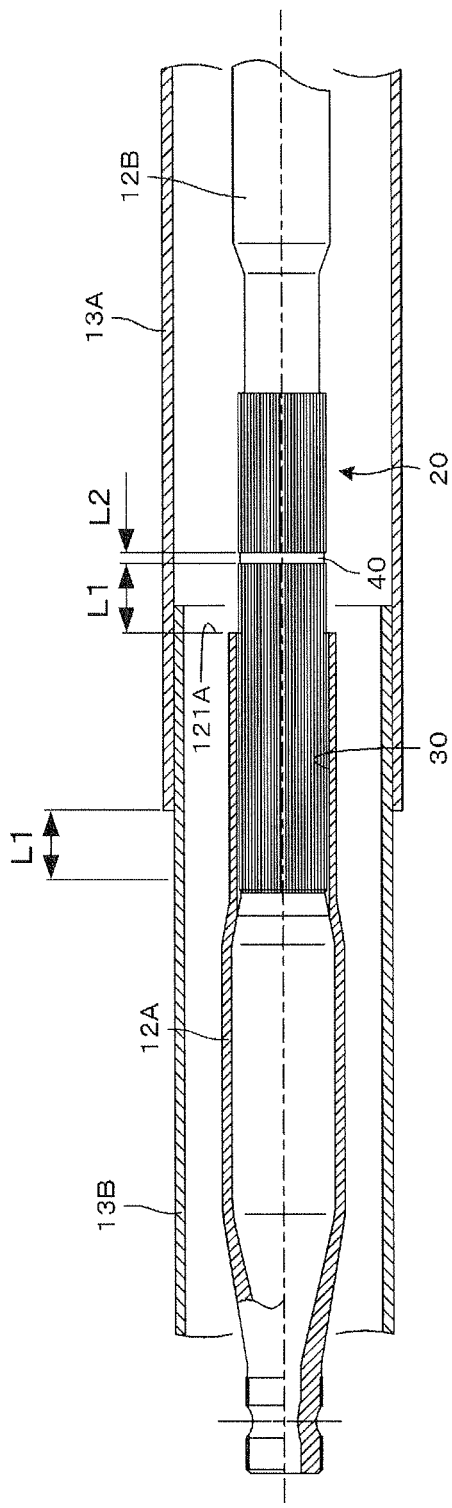
FIG. 6 is a sectional view showing principal parts of a male shaft, and a female shaft, respectively, as to a steering device according to a third embodiment of the invention.
Figure 7:
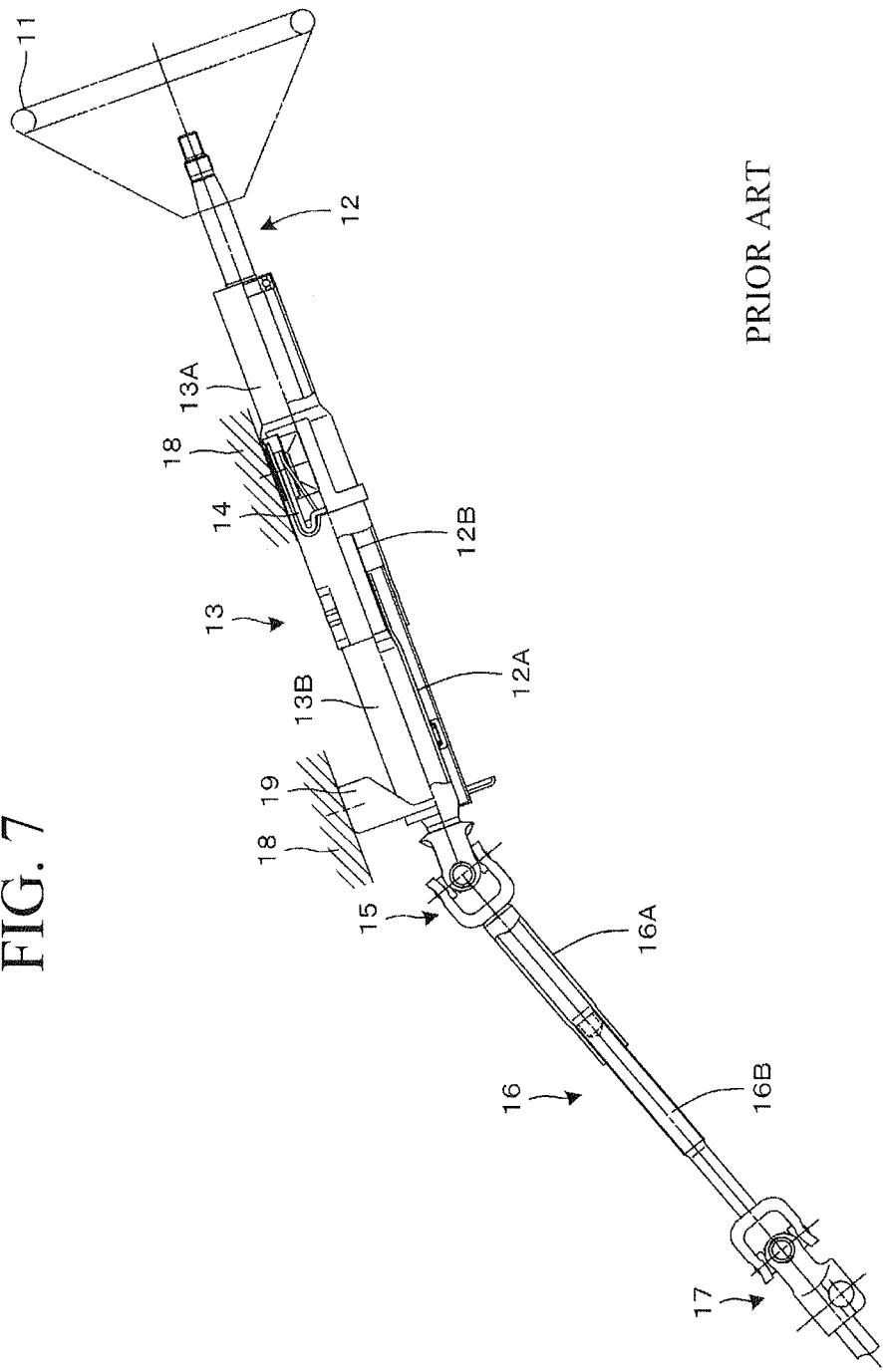
FIG. 7 is a partially cutaway side view of a steering device according to a related art.
Figure 8:
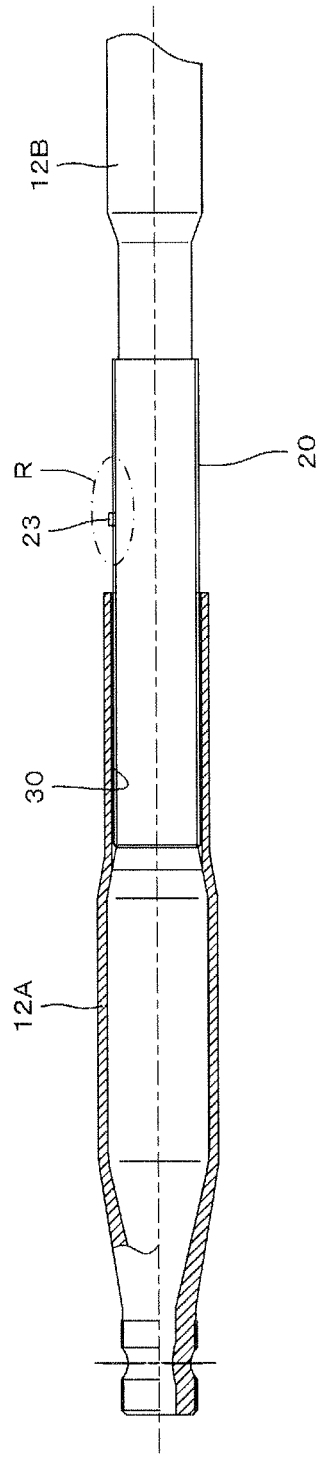
FIG. 8(a) is a sectional view of the steering device shown in FIG. 7, showing principal parts of a male shaft, and a female shaft, respectively, FIG. 8 (b) being an enlarged perspective view of a part R in 8 (a).
Figure 8:
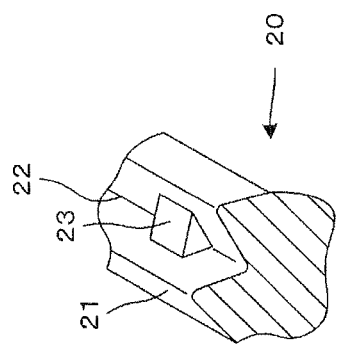

Subsequently, a steering device according to a third embodiment of the invention is described hereinafter. FIG. 6 is a sectional view showing principal parts of a male shaft, and a female shaft, respectively, as to a steering device according to the third embodiment of the invention. In the following description, there are described only parts differing in structure from those according to the first embodiment, thereby omitting duplicated description. Further, in the figure, components identical to those according to the first embodiment are denoted by like reference numerals, respectively.

The third embodiment of the invention is a variation of the first embodiment, representing an example in which an impact-energy absorption part is formed at a female shaft as well as a male shaft of a steering device capable of adjusting a telescopic position of a steering wheel. As shown in FIG. 6, an outer column 13A is fitted onto an inner column 13B in such a way as to enable a telescopic-position to be adjusted by a telescopic-position adjust length L1. A male shaft 12B is rotatably, and axially supported by the outer column 13A, and a female shaft 12A is rotatably, and axially supported by the inner column 13B, the steering wheel being fittable to the right end of the female shaft 12A.

A male serration 20 formed on the outer periphery of the left-end of the male shaft 12B is fitted into a female serration 30 formed on the inner periphery of the right-end of the female shaft 12A to be brought into serration-engagement with the latter. If the telescopic-position of the outer column 13A, in relation to the inner column 13B, is adjusted to suit the physique of a driver, the male serration 20 of the male shaft 12B will smoothly expand, and contract against the female serration 30 of the female shaft 12A within a range of the telescopic-position adjust length L1.

The male serration 20 includes an impact-energy absorption part 40 formed at a position away from a right-end surface (a butting surface) 121A of the female shaft 12A by a length L1 (identical to the telescopic-position adjust length L1). The impact-energy absorption part 40 has a length L2, in the axial direction of the male serration 20, being formed in the shape of a cylinder surrounding the whole circumference of the outer periphery of the male shaft 12B. As is the case with the first embodiment shown in FIGS. 2, and 3(a), respectively, the impact-energy absorption part 40 is formed such that an outside diameter size D1 thereof is larger in size than a diameter D2 of a serrated edge circle of a serrated edge 31 of the female serration 30.

If the outer column 13A undergoes contraction against the inner column 13B upon a collision occurring to a vehicle, thereby causing the male shaft 12B to undergo contraction against the female shaft 12A by the telescopic-position adjust length L1, the serrated edge 31 on the right-end surface (the butting surface) 121A of the female shaft 12A is butted against a left-end surface 41 (a butting surface) of the impact-energy absorption part 40. Then, the serrated edge 31 is firmly butted against the left-end surface 41 (the butting surface) of the impact-energy absorption part 40 to undergo plastic deformation, whereupon resistance to collapsing increases, thereby absorbing impact energy.

With the third embodiment of the invention, the serrated edge 31 of the female shaft 12A is butted against the left-end surface 41 of the impact-energy absorption part 40, surrounding the whole outer periphery of the male shaft 12B, in the circumferential direction thereof, so that torsion does not occur between the female shaft 12A, and the male shaft 12B, thereby stabilizing an absorption amount of impact energy.

If at least one factor selected from among the length L2 of the impact-energy absorption part 40, in the axial direction thereof, the outside diameter size D1 of the impact-energy absorption part 40, and hardness of the male shaft 12B is set to a predetermined magnitude, this will enable the absorption amount of impact energy to be set to a predetermined magnitude.

With the first to third embodiments of the invention, respectively, there is described an example in which the serration is formed on the female shaft 12A, and the male shaft 12B, respectively, however, splines instead of the serration may be formed on the female shaft 12A, and the male shaft 12B, respectively. With the first to second embodiments of the invention, respectively, there is described an example in which the invention has been applied to the steering shaft, however, the invention may be applied to an intermediate shaft instead. Further, with the second embodiment, the impact-energy absorption part is formed at two spots apart from each other, in the axial direction of the male shaft 12B, however, the impact-energy absorption part may be formed at not less than two spots apart from each other, in the axial direction of the male shaft 12B.

DESCRIPTION OF REFERENCE NUMERALS

11: steering wheel
12: steering shaft
12A: female steering shaft (female shaft)

121A: right-end surface (butting surface)
122A: outer peripheral surface at the right-end
12B: male steering shaft (male shaft)
13: steering column
13A: outer column
13B: inner column
14: upper support bracket
15: universal coupling
16: intermediate shaft 16
16A: female intermediate shaft (female shaft)
16B: male intermediate shaft (male shaft)
17: universal coupling
18: body
19: lower support bracket
20: male serration
21: teeth
22: recess
23: protrusion
30: female serration
31: serrated edge
40: impact-energy absorption part
41: left-end surface (butting surface)
50: impact-energy absorption part
51: left-end surface 51 (butting surface)

The invention claimed is:

1. A steering device comprising:
a male shaft capable of transferring rotation of a steering wheel;
a male serration formed on the outer periphery of the male shaft;
a female shaft fitted onto the male shaft; and
a female serration formed on the inner periphery of the female shaft to be brought into engagement with the male serration in such a way as to be relatively movable in the axial direction of the female serration, and to cause a rotation torque to be transferable, wherein
an outer peripheral surface of the female shaft is pressed inward in the radial direction thereof to thereby cause the female shaft, and the male shaft to undergo plastic deformation into the shape of an ellipse in cross-section such that an absorption amount of the impact energy at the beginning of contraction of the male shaft against the female shaft at the time of a vehicle collision is at a predetermined magnitude, and
an impact-energy absorption part formed in such a way as to surround the whole circumference of the outer periphery of the male shaft, having a predetermined length in the axial direction of the male serration, an outside diameter of the impact-energy absorption part being larger in size than a diameter of a circle of a serrated edge of the female serration, so as to cause the serrated edge of the female serration to be butted against the impact-energy absorption part, thereby absorbing impact energy, is provided in a region where, upon the male shaft undergoing further relative contraction against the female male shaft, the male serration comes into engagement with the female serration in the middle of the contraction.

2. The steering device according to claim 1, wherein the impact-energy absorption part is formed at a plurality of spots apart from each other in the axial direction of the male shaft.

3. The steering device according to claim 1, wherein a length of the impact-energy absorption part, in the axial direction thereof, is set such that an absorption amount of the impact energy will be at a predetermined magnitude.

4. The steering device according to claim 1, wherein an outside diameter size of the impact-energy absorption part is set such that an absorption amount of the impact energy will be at a predetermined magnitude.

5. The steering device according to claim 1, wherein hardness of the male shaft is set such that an absorption amount of the impact energy will be at a predetermined magnitude.

6. The steering device according to claim 1, wherein a tilt angle of a butting surface where the impact-energy absorption part is butted against the serrated edge of the female serration is set such that an absorption amount of the impact energy will be at a predetermined magnitude.

7. The steering device according to claim 1, wherein a tilt angle of a butting surface where the serrated edge of the female serration is butted against the impact-energy absorption part is set such that an absorption amount of the impact energy will be at a predetermined magnitude.

\* \* \* \* \*